(12) United States Patent
King

(10) Patent No.: US 11,494,538 B1
(45) Date of Patent: Nov. 8, 2022

(54) SIMULATION GENERATION USING TEMPORAL LOGIC

(71) Applicant: Zoox, Inc., Foster City, CA (US)

(72) Inventor: Andrew Lewis King, Los Altos, CA (US)

(73) Assignee: Zoox, Inc., Foster City, CA (US)

( * ) Notice: Subject to any disclaimer, the term of this patent is extended or adjusted under 35 U.S.C. 154(b) by 702 days.

(21) Appl. No.: 16/401,795

(22) Filed: May 2, 2019

Related U.S. Application Data

(60) Provisional application No. 62/821,301, filed on Mar. 20, 2019.

(51) Int. Cl.
*G06F 30/331* (2020.01)
*G06F 111/04* (2020.01)

(52) U.S. Cl.
CPC ........ *G06F 30/331* (2020.01); *G06F 2111/04* (2020.01)

(58) Field of Classification Search
CPC ............................ G06F 30/331; G06F 2111/04
See application file for complete search history.

(56) References Cited

U.S. PATENT DOCUMENTS

| | | | | |
|---|---|---|---|---|
| 11,120,174 | B1* | 9/2021 | Ciarlini | G06F 30/20 |
| 2008/0072190 | A1* | 3/2008 | Jain | G06F 30/3323 |
| | | | | 716/103 |
| 2013/0124164 | A1* | 5/2013 | Jha | G06F 30/00 |
| | | | | 703/2 |

OTHER PUBLICATIONS

Jha (Jha, S. K., Langmead, C. J., Mohalik, S., & Ramesh, S. (Mar. 2011). When to stop verification?: statistical trade-off between expected loss and simulation cost. In 2011 Design, Automation & Test in Europe (pp. 1-6). IEEE.) (Year: 2011).*
Jha 2 (Jha, S., Raman, V., Sadigh, D., & Seshia, S. A. (2018). Safe autonomy under perception uncertainty using chance-constrained temporal logic. Journal of Automated Reasoning, 60(1), 43-62.) (Year: 2018).*
B2016 (Balasubramaniyan, S., Srinivasan, S., Buonopane, F., Subathra, B., Vain, J., & Ramaswamy, S. (2016). Design and verification of Cyber-Physical Systems using TrueTime, evolutionary optimization and UPPAAL. Microprocessors and microsystems , 42, 37-48.) (Year: 2016).*

* cited by examiner

*Primary Examiner* — Bijan Mapar
(74) *Attorney, Agent, or Firm* — Lee & Hayes, P.C.

(57) ABSTRACT

Techniques for determining simulations to confirm programmatic logic are discussed herein. Such simulations may be used to identify errors in programmatic logic. As an example, a system may simulate an autonomous vehicle operating in an environment by setting various initialization parameters. Temporal logic, such as Linear Temporal Logic (LTL) and/or Signal Temporal Logic (STL) may be used to determine a numeric cost associated with how closely one or more policies are violated for each simulation of a group of simulations. Based on the costs computed, additional sets of simulations may be created using an evolutionary algorithm. Flaws in programmatic logic controlling the system may be identified based on the evolutionary algorithms and cost defined.

20 Claims, 7 Drawing Sheets

SIMULATION GENERATION USING TEMPORAL LOGIC

CROSS-REFERENCE TO RELATED APPLICATIONS

This application claims the benefit of the filing date under 35 USC 119(e) of the provisional application entitled "Simulation Generation Using Temporal Logic" Ser. No. 62/821,301, filed on Mar. 20, 2019, the entire contents of which is fully incorporated herein by reference.

BACKGROUND

Various methods, apparatuses, and systems are utilized by programmers to simulate scenarios for systems to assert whether or not the system is robust to ranges of parameters (i.e., they perform as expected). Traditionally, programmers identify a potential variable(s) (such as an object in an environment) and run one or more simulations to confirm if the system behaves as expected (e.g., whether the potential object may affect the system in unanticipated ways). In the context of autonomous vehicles, a training simulation may be used to confirm proper algorithmic behavior and/or as a probe to change programmatic logic, etc. (e.g., to determine an action for the autonomous vehicle to take in order to avoid the potential object).

The number of potential objects, respective initialization variables, their ranges, and/or training simulations that are identified may be limited to the programmer's experience and/or imagination. Additionally, behavior of other objects in the environment and road conditions can be unpredictable. Due to the unpredictability, it may be difficult for the programmer to identify many training simulations in which programmatic logic may not behave as intended. A limitation on the number of identified training simulations may limit an ability of the test system to determine logical flaws, or otherwise definitively make a statement about an ability for an algorithm to converge.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
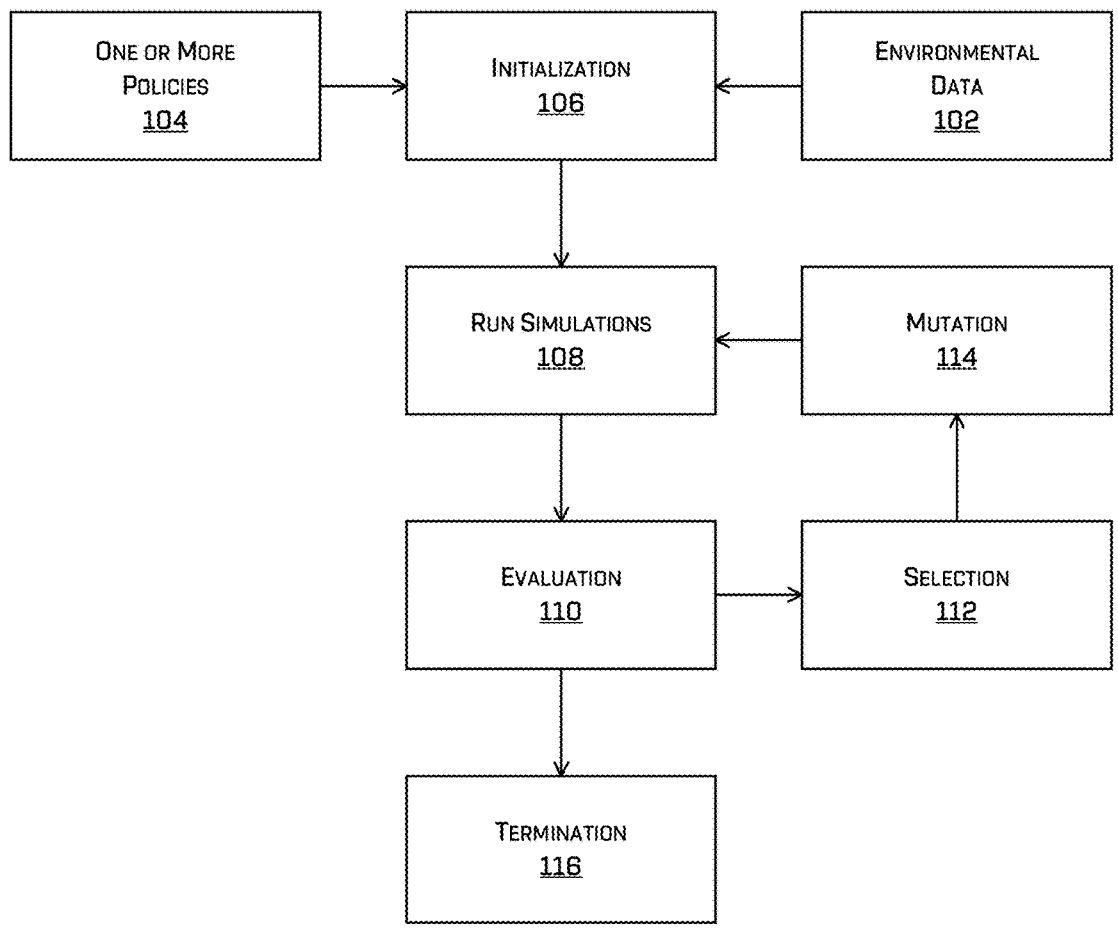
FIG. 1 illustrates an example diagram of a flow for generating simulations and identifying an exemplary simulation.

This disclosure describes methods, apparatuses, and systems for optimizing a number of simulations for evaluating a component or system. In some instances, optimizing the number of simulations may include minimizing a number of simulations to be evaluated. In some cases, the number of simulations may be optimized using temporal logic. In at least one example, the methods, apparatuses, and systems described herein utilize Temporal Logic (TL) to identify exemplary simulations. An exemplary simulation may include a simulation that fails to operate according to the one or more defined policies and/or limitations. In some examples, the TL may include Linear Temporal Logic (LTL) and/or Metric-Intersection Propositions, such as those used to describe whether two sets have a non-null intersection. In such examples, the methods, apparatuses, and systems described herein may utilize Metric Intersection Linear Temporal Logic (MI-LTL). In some examples, the methods, apparatuses, and systems described herein may identify exemplary simulations utilizing Signal Temporal Logic (STL), or the like. Additionally, or in the alternative, search algorithms, such as a Monte Carlo Tree Search (MCTS), with neural network control policies are incorporated to leverage machine learning and tree search to identify exemplary simulations. According to any one or more of the techniques enumerated herein, such temporal logic may be used to translate discrete scenario evaluation criteria into a continuous cost, used for determining further simulations.

Although described herein with respect to simulating a response of an autonomous vehicle in an environment to one or more objects, policies, etc., the disclosure is not meant to be so limiting. In general, the techniques disclosed herein are equally valid for confirming whether or not programmatic logic of a system sufficiently accounts for all potential scenarios (ranges of initialization parameters), without the need to fuzz (e.g., test for coding error) such variables. As non-limiting examples, such techniques may be equally applicable, for example, with respect to power plant control, robotic manipulators, curing processes, etc., as well as any other system which uses programmatic logic for control.

In an example of testing programmatic logic for an autonomous vehicle to operate as expected, a simulation computing system may receive data corresponding to an environment in which a vehicle may operate. The vehicle may include an autonomous vehicle, semi-autonomous vehicle, or a manually operated vehicle. The data may include a location of the vehicle in a road, the size of a road (e.g., number of lanes, width of lanes, proximity of barriers, etc.), vehicle condition (e.g., tread on tires, brake pad wear, etc.), object condition (e.g., tread on tires, brake pad wear, etc.), a number of objects (e.g., other vehicles, motorcycles, pedestrians, bicyclists, etc.) present in the environment, weather considerations (e.g., rain, snow, sleet, etc.), road conditions (e.g., paved, gravel, potholes, wet, dry, oily, etc.), and other data related to the environment in which the vehicle operates. The simulation computing system may also receive one or more limitations regarding the operation of the vehicle. The limitation(s) may include properties the vehicle satisfies during operation. For example, a limitation may include that the vehicle does not come within a threshold distance of an object in the environment during operation. Of course, any other parameter associated with such a simulation may be varied (object classification, bounding box, extents, appearance, etc.).

The simulation computing system may generate a group of simulations based at least in part on the environmental data. In various examples, the group of simulations may be generated by modifying a position, a velocity, an acceleration, or other operating constraint associated with the vehicle and/or one or more objects in the environment. For example, a first simulation may include a vehicle approaching a four-way intersection at 10 miles per hour and an object located 35 feet ahead and 25 feet to the right of the vehicle, while a second simulation may include a vehicle approaching the four-way intersection at 7 miles per hour and an object located 25 feet ahead and 30 feet to the right of the vehicle.

The simulation computing system may determine whether a simulation of the group of simulations violates a limitation of the one or more limitations, as may be enumerated by the user. In some examples, the computing system may utilize temporal logic to determine whether a limitation is violated. In at least one example, the computing system may utilize Linear Temporal Logic, such as MI-LTL described above.

Additionally, or in the alternative, the simulation computing system may utilize search algorithms, such as a Monte Carlo Tree Search (MCTS), with neural network control policies to leverage machine learning and tree search to identify exemplary simulations. In some examples, the simulation computing system may utilize the MCTS, where each high-level option is represented by a learned control policy trained on a set of LTL formulas based on the environmental data. In such examples, a good tree search policy can be defined, for which two complementary levels of reinforcement learning are used. In some examples, prior information from expert demonstrations can be used to initialize this search with "good" high-level discrete action distributions. In still other examples, such an initialization of data can be from machine learning algorithms. In general, the simulation computing system may utilize a tree search algorithm such as MCTS to organize and search through possible simulations, while using temporal logic formulas, such as LTL formulas to verify whether the possible simulations violate a limitation.

In at least one or more examples, evolutionary, or genetic, algorithms may be employed to explore the parameter space to determine which scenarios violate the one or more formulae. In such examples, an initial set size may be generated having distributions (normal, random, unit, non-linear, etc.) about one or more variables used to generate the scenario.

Based on a determination that a simulation (which may be one of the set of simulations) violates a limitation, the simulation computing system may identify the simulation as an exemplary simulation (e.g., an example simulation which fails to operate according to the one or more policies defined). The simulation computing system may provide the exemplary simulation to a programmatic logic-based controller to indicate potential flaws in the programmatic logic. In some examples, a computing system associated with the controller and the simulation computing system may each comprise components of a computing system configured to program autonomous vehicles.

Based on a determination that each simulation of the group of simulations does not violate a limitation, the simulation computing system may determine a cost for each simulation. The cost may represent how close a simulation came to violating a limitation. For example, a simulation with a low cost may come very close to violating a limitation, such as a near miss from impacting the vehicle. For another example, a simulation with a high cost may come very close to violating a limitation. In various examples, the simulation computing system may rank the simulations based on the cost (e.g., how close a simulation came to violating a limitation). In various examples, the simulation computing system may identify a subset of simulations (e.g., of the set of simulations) based on the ranking. In such examples, the subset of simulations may be those at or above a threshold ranking (e.g., top 10% of the ranked simulations, top 20 ranked simulations, etc.). In some examples, the subset of simulations may include the simulations with a cost above a threshold cost. Such costs may be computed in accordance with the temporal logic formulae described in detail herein.

The simulation computing system may generate a second group, or set, of simulations based on the subset of simulations identified based on the cost. In various examples, the second group of simulations may be generated using one or more evolutionary algorithms. For example, for a given set size, n, one or more combinations of the second set may be combined (in addition to an amount of randomization) to generate a second generation (e.g., group) which has the same set size, n. Such evaluations, refinement, and the like may continue for a set number of generations (M), a set number of iterations per generation, one or more stopping criteria are reached (e.g., any one or more, or average, of a cost of 0 is identified, a cost has not changed by more than a threshold amount, a rate of change of the cost has not changed more than a threshold amount, and the like). Similar to the determination described above, the simulation computing system may utilize temporal logic to determine whether a simulation violates a limitation (e.g., has a cost of zero, or a maximum cost).

Based on a determination that a simulation of the second group of simulations violates a limitation, the simulation computing system may identify the simulation as an exemplary simulation. The simulation computing system may provide the exemplary simulation for inspection to determine a fault in one or more programmatic logic statements of the control system (e.g., planning logic of the autonomous vehicle). In some examples, the simulation computing system may cause a controller to modify the one or more programmatic logic statements of the control system. In some examples, the simulation computing system may send an instruction to modify the control system substantially concurrently with the exemplary simulation. In some examples, the controller may be programmed to automatically modify the control system based on receipt of an exemplary simulation and the data associated therewith. Based on a determination that none of the simulations of the second group of simulations violate a limitation, the simulation computing system may determine a cost corresponding to each simulation of the second group of simulations, rank the simulations based on cost, determine a subset of the simulations, identify additional simulations based on the subset, and test the additional simulations for violations of a limitation in accordance with various evolutionary, or genetic, algorithms.

In various examples, the simulation computing system may iteratively perform the steps outlined above until the simulation computing system identifies an exemplary simulation (e.g., a simulation in which a limitation is violated). In some examples, the simulation computing system may iteratively perform the steps outlined above until it has generated a threshold number of generations and/or performed a threshold number of iterations (e.g., 25, 55, 100, etc.) (e.g., per generation) without identifying an exemplary simulation. In some examples, the simulation computing system may iteratively perform the steps outlined above until a cost is below a first threshold and/or meets or exceeds a second threshold.

The techniques described herein include improvements to the technology associated with programming control systems for autonomous vehicles. Traditionally, control system programmers identify a potential variable in an environment in which a vehicle operates and run simulations to determine whether the vehicle performs as expected. The simulations may be used to confirm proper algorithmic behavior and/or as a probe to change programmatic logic. However, the testing for proper algorithmic behavior, and thus the overall control system of the vehicle, may be limited to a number of variables the programmers select to test. In other words, traditional systems may be limited based on the programmer's experience and/or imagination.

The limitations on testing algorithms associated with control systems resulted in the technical problem of overall effectiveness and efficacy of the control systems. The techniques described herein solve the technical problem by at least automating a process for testing the effectiveness and efficacy of algorithms associated with the vehicle control systems. The automation of the previously manual system of identifying and testing variables in an environment improves the effectiveness of tests and improves the overall effectiveness and efficacy of the control systems. For example, automatically generating simulations using evolutionary algorithms to test whether a policy may be violated and providing exemplary simulations to the programmers to adjust one or more algorithms in a control planning system may assist in preventing the control planning system from causing the vehicle to follow an undesirable path.

Additionally, the techniques described herein are capable of determining policy violations at a fraction of the computational cost of traditional methods. In at least one example, a computing system utilizing the techniques described here identified a policy violation using less than 10% of the computing resources required by traditional methods. As such, the techniques described herein further improve the functioning of the computing system (e.g., simulation computing system, vehicle computing system, etc.).

Furthermore, the techniques described herein may improve the functioning of a control system computing device, such as a simulation computing device. In conventional models, the control system computing devices may run simulations on random variables to determine whether the algorithms include logical flaws. The techniques described herein use evolutionary algorithm(s) and cost function(s) generated using temporal logic to direct the computational focus on variables that may result in a violation of a policy. The direction toward driving a cost function to be minimized or maximized, as described herein, may reduce a total number of calculations required to reach a desired result (e.g., identifying variables associated with a policy violation), thereby improving the functioning of the control system computing device.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems requiring autonomous or semi-autonomous control, such as industrial robots or unmanned aerial vehicles. For example, the methods, apparatuses, and systems can be utilized in a manufacturing assembly line context, in an aerial surveying context, etc. Additionally, the techniques described herein can be used with real data (e.g., captured using sensor(s)), simulated data (e.g., generated by a simulator), or any combination of the two.

FIG. 1 illustrates an example diagram of a flow 100 for generating simulations and identifying an exemplary simulation associated with a violation of a limitation, as described herein. The flow 100 may be performed by a simulation computing system. In some examples, the simulation computing system may comprise a portion of a computing system (e.g., simulation component) designed to program autonomous vehicles to operate in an environment.

The simulation computing system may receive, or otherwise determine, environmental data 102 (e.g., characteristics associated with the environment, parameters, etc.). The environmental data 102 may describe an environment in which a control system (e.g., associated with an autonomous vehicle) may operate. In the example of an autonomous vehicle, the environmental data 102 may include a location of the vehicle in a road, an intersection (e.g., four-way intersection, T-intersection, etc.), the size of a road (e.g., number of lanes, width of lanes, proximity of barriers, etc.), vehicle condition (e.g., tread on tires, brake pad wear, etc.), object condition (e.g., tread on tires, brake pad wear, etc.), a number of objects (e.g., other vehicles, motorcycles, pedestrians, bicyclists, etc.) present in the environment, relative sizes of the objects, relative positions of the objects, relative velocities (linear and/or rotational) of the objects, accelerations of the objects, object classification, weather considerations (e.g., rain, snow, sleet, etc.), road conditions (e.g., paved, gravel, potholes, wet, dry, oily, etc.), comfort of passengers, safety, rules of the road (e.g., speed limit(s), direction of traffic, etc.), rules of good driving, and other data related to the environment in which the vehicle operates. For example, the environmental data 102 may describe a T-intersection toward which a vehicle approaches with a first object approaching the intersection from the left and a second object present in the intersection.

The simulation computing system may also receive one or more policies 104 (or constraints, limitations, etc.) for the control system to follow. The policies 104 may include properties the control system is required to satisfy during operation. For example, a limitation may include that the vehicle does not come within a threshold distance of an object in the environment during operation. In one or more examples, such policies may be expressed in terms of temporal logic and, in particular examples, in the form of metric-intersection linear temporal logic.

As illustrated in FIG. 1, the simulation computing system may perform an initialization 106 based on the environmental data 102 and/or the policies 104. The initialization 106 may include generating a group of simulations based on the environmental data 102 and/or the policies 104. Simulations of the group of simulations may include properties describing the objects and/or vehicle in the environment. The group of simulations may differ based on random, normal, or otherwise distributions of the environmental data 102. The properties may include a location, a bounding box (e.g., length, width, and/or height), a velocity, an acceleration, or the like. In some examples, each of the simulations in the group of simulations may include one or more properties that differ from other simulations in the group of simulations. The number of simulations of the group may be referred to as having a number, n, simulations.

The simulation computing system may then run simulations 108 (either in parallel (substantially simultaneously within technical tolerances), serially, or asynchronously). The run simulations 108 step may include determining positions associated with the vehicle and objects in the environment over time.

The simulation computing system may perform an evaluation 110 of each simulation from the run simulations 108. Such evaluations may be performed during any step (e.g., time step) of the simulation. In some examples, the evaluation 110 may determine whether a simulation violates a limitation of the received policies 104. In various examples, the simulation computing system may utilize temporal logic to perform the evaluation 110. Temporal logic (TL) can be used to model or encode formulas about the future of paths or objects, and whether conditions will eventually be true, whether a condition will be true until another fact becomes true, etc. In some instances, the temporal logic may include linear temporal logic (LTL) signal temporal logic (STL), interval temporal logic (ITL), computational tree logic (CTL), property specification language (PSL), Hennessy-Milner logic (HML), etc. In at least some examples, such temporal logic may encode various policies 104 such that evaluation at every step of simulation may result in a numerical result indicative of how closely a simulation comes to violating one or more of the properties.

For examples, TL can be used to concisely and precisely specify permitted and prohibited system behaviors in terms of the corresponding words. In at least one example, the simulation computing system may utilize metric-intersection linear temporal logic (MI-LTL). In such examples, the MI-LTL replaces propositional statements with Metric-Intersection Propositions (MIP). MIPs include a list of intersection statements. For example, Fn and Fm represent two computable functions that take a simulation state s and return a subset of the same metric space (i.e., intersection of two simulations in the same space). MI–LTL may be further represented by the following statements: if p∈ MIP then p is a MI–LTL formula; if ϕ is a MI–LTL formula then so are ¬ϕ, Gϕ, Xϕ, and Fϕ; and if ϕ and ψ are MI–LTL formulas, then so are ϕ∧ψ, ϕ∨ψ, ϕUψ, and ϕRψ.

The evaluation 110 may apply an MI-LTL formula to each simulation of the group of simulations. Additional semantics of MI-LTL formulae comprise the following:

$$
\begin{array}{rl}
w \vDash & F_m(s) \cap F_n(s) \neq 0 \text{ if } F_m(w(0)) \cap F_n(w(0)) \neq 0. \\
w \vDash & \neg \phi \text{ if } w \nvDash \phi. \\
w \vDash & \phi \vee \psi \text{ if } w \vDash \phi \text{ or } w \vDash \psi. \\
w \vDash & \phi \wedge \psi \text{ if } w \vDash \phi \text{ and } w \vDash \psi. \\
w \vDash & X\phi \text{ if } w^1 \vDash \phi. \\
w \vDash & G\phi \text{ if for all } 0 \leq i < \text{length}(w) \text{ such that } w^i \vDash \phi. \\
w \vDash & F\phi \text{ if there exists some} \\
& 0 \leq i < \text{length}(w) \text{ such that } w^i \vDash \phi. \\
w \vDash & \phi U \psi \text{ if there exists some } 0 \leq i < \text{length}(w) \\
& \text{such that } w^i \vDash \psi \text{ and for all } 0 \leq j < i, w^j \vDash \phi. \\
w \vDash & \phi R \psi \text{ if either the following is true:} \\
& \text{1. There exists some } 0 \leq i < \text{length}(w) \text{ such that } w^i \vDash \phi \\
& \quad \text{ and for all } 0 \leq j < i, w^j \vDash \psi. \\
& \text{2. For all } 0 \leq i < \text{length}(w), w^i \vDash \psi,
\end{array} \quad (1)
$$

where $w(i)=s_i$ (i.e., state at position i) and $w_i = s_i, s_{i+1}, \ldots s_n$ (i.e., the $i^{th}$ suffix). In such a system, Xϕ expresses that ϕ is true in a subsequent "step" or position in the run's state sequence (e.g., ne<u>X</u>t), ϕUψ expresses that ϕ is true until ψ becomes true (e.g., <u>U</u>ntil), Gϕ means that ϕ is true in every position (e.g., <u>G</u>lobally true), Fϕ means ϕ is true at some position (e.g., <u>F</u>inally), and ϕRψ expresses that ψ holds indefinitely until q becomes true (e.g., <u>R</u>elease). Importantly, in some examples, changes in atomic propositions can be described over time.

In general, it is possible to define two primary types of properties allowed in a specification: safety properties, which guarantee that "something bad never happens", and liveness conditions, which state that "something good (eventually) happens." Such types correspond naturally to LTL formulas with operators "always" (G) and "eventually" (F), as discussed above.

The evaluation 110 may include determining whether a limitation is violated in a particular simulation. In various examples, a cost function may be used to determine whether a limitation is violated. For example, a set of simulations, such as those run in the run simulations 108 step, may be represented as $w=s_0, s_1, s_2, \ldots, s_n$ and a limitation that the vehicle satisfies during operation may be represented as Φ. The cost function Ω takes w and Φ and returns 0 if an only if w satisfies Φ, represented as $w \vDash \Phi \Leftrightarrow \Omega(w,\Phi)=0$. In other words, the cost function Ω returns 0 if the simulation violates the limitation Φ. Goal statements may be constructed from the one or more policies 104. A negation of the goal statement expressed in terms of MI-LTL may then be used to determine the cost, as described in detail below. As a non-limiting example, expressing a goal in such terms may transform a binary, or otherwise non-numeric representation of a policy evaluation (e.g., was the correct color applied to a component in a robotically controlled assembly system?) into a number indicative of how closely the system complied with such a policy.

In some examples, such as those in which the limitation Φ is not violated, the simulation computing system may apply the cost function to each simulation to determine a cost associated respective simulations. For example, if w does not satisfy Φ, the cost function Ω will be greater than zero, such that $w \nvDash \Phi \Leftrightarrow \Omega(w,\Phi)>0$. In various examples, the cost function may be incremental, such that simulations that vary may return costs that vary. For example, simulation $w_1$ varies from $w_2$, and $\Omega(w_1, \Phi)$ varies from $\Omega(w_2, \Phi)$. For another example, $s_1$ varies from $s_2$, and $\Omega(s_1, \Phi)$ varies from $\Omega(s_2, \Phi)$.

In various examples, the cost function may represent an amount or "distance" that a simulation is from violating the limitation. Generally, a metric may be defined which identifies a representation of how far two states in such a metric space differ from one another. In some examples, the distance may correspond to a distance in a state space and/or a distance in a geometric space (e.g., a Euclidian distance). In various examples, the simulation computing system may determine distance measures for the intersections of subsets of the same metric space used in the MI-LTL propositions. The simulation computing system may then apply rules that follow the structure of an MI-LTL formula to combine the determined distance measures. Since MIP includes statements of the form Fm(s)∩Fn(s)≠0, where Fm(s) and Fn(s) are subsets of the same metric space, a metric δ: Fm(s)× Fn(s)→ℝ gives the distance between any two elements of Fm(s) and Fn(s). The metric δ may include a minimum distance a set is translated before it intersects with another set.

In various examples, the cost associated with a given simulation may be based on a distance to an intersection and/or a distance to disjunction. A distance to an intersection may be represented as follows:

$$\delta_\cap(X, Y) = \min_{x \in X, y \in Y} \delta(x, y), \quad (2)$$

where M is a metric set and X⊆M and Y⊆M and the distance to intersection between X and Y, represented as $\delta_\cap(X,Y)$ is the distance between the two closest points in X and Y.

Whereas a distance to disjunction (e.g., the dual of the distance) may be represented as follows:

$$\neg \delta_\cap(X, Y) = \min_{(m_x, m_y) \in H_{xy}} \left( \min_{x \in X, y \in Y} \delta(m_x(x), m_y(y)) \right), \quad (3)$$

where M is the metric set and $X \subseteq M$ and $Y \subseteq M$ and the distance to disjunction (i.e., the distance until it is the case that $X \cap Y = 0$) represented as $\neg \delta_\cap(X, Y)$ is the smallest distance between any translations of X and Y such that those translations do not intersect. $H_x$ may represent a set of mappings between X and translations associated with X and $H_y$ may represent a set of mappings between Y and translations associated with Y. Additionally, $H_{xy} = \{(m_x, m_y) | m_x \in H_y, m_y \in H_y, m_x(x) \cap m_y(y) = 0$.

In various examples, the evaluation 110 may include transforming the limitation Φ (policy) to negation normal form (NNF). A transformation to NNF may include treating each sub-expression of the form $Fm(s) \cap Fn(s) \neq 0$ as a Boolean proposition and then applying DeMorgan's law and exploiting the dual relationships for temporal operators to push any negations inward. The result of the transformation may be represented as $\Phi_{NNF}$.

In various examples, the evaluation 110 may include recursively applying the cost function Ω to calculate the cost of $\Phi_{NNF}$ over a given simulation w. The cost function Ω that pattern matches on the syntax of $\Phi_{NNF}$ may be represented by the following equations:

$$\Omega(w, F_m(s) \cap F_n(s) \neq 0) \Rightarrow \delta_\cap(F_m(w(0)), F_n(w(0))) \quad (4)$$

$$\Omega(w, \neg F_m(s) \cap F_n(s) \neq 0) \Rightarrow \delta_\cap(F_m(w(0)), F_n(w(0))) \quad (5)$$

$$\Omega(w, \Phi_1 \wedge \Phi_2) \Rightarrow \Omega(w, \Phi_1) + \Omega(w, \Phi_2) \quad (6)$$

$$\Omega(w, \Phi_1 \vee \Phi_2) \Rightarrow \min(\Omega(w, \Phi_1), \Omega(w, \Phi_2)) \quad (7)$$

$$\Omega(w, X_\phi) \Rightarrow Q(w^1, \phi) \quad (8)$$

$$\Omega(w, \psi U \phi) \Rightarrow \min_{i=0}^{|w|-2}((\Sigma_{j=0}^{i} \Omega(w^j, \psi) + \Omega(w^{i+1}, \phi)) \quad (9)$$

$$\Omega(w, \psi R \phi) \Rightarrow \min(\min_{i=0}^{|w|-1}((\Sigma_{j=0}^{i} \Omega(w^j, \phi) + \Omega(w^i, \psi)), \Sigma_{i=0}^{|w|-1} \Omega(w^i, \phi)) \quad (10)$$

In other words, given a formula $\Phi_1 \wedge \Phi_2$ then $\Omega(w, \Phi_1)$ and $\Omega(w, \Phi_2)$ should both be 0, thus the two terms ($\Omega(w, \Phi_1)$, $\Omega(w, \Phi_2)$) are added together to penalize the cost of either case being greater than 0. Similarly, for $\Phi_1 \vee \Phi_2$ the distance should be 0 if the distance for either $\Phi_1$ or $\Phi_2$ is 0. The approach may then be generalized over the temporal operators (e.g., G is equivalent to $\wedge$ over all simulation states in a trace).

In various examples, the simulation computing system may rank the simulations based on costs associated therewith (e.g., high cost to low cost, or vice versa). In various examples (e.g., those examples in which a cost of zero was not identified in any of the simulations of the group), the simulation computing system may select a subset of the group of simulations at selection 112. In some examples, the subset may be selected based on a cost associated with each simulation. In various examples, the selection 112 may include selecting simulations that are below a first threshold cost or that meet or exceed a second threshold cost. In some examples, selection 112 may include selecting a pre-determined number (e.g., 10, 15, 20, etc.) and/or percentage of simulations (e.g., 10%, 20%, etc.). As a note, though simulations are selected with respect to costs closest to zero, similar formulations are contemplated in which a cost is to be maximized.

The simulation computing system may process the subset of simulations through mutation 114. In various examples, the processing may include generating a second group of simulations. In some examples, the second group of simulations may be generated using one or more evolutionary algorithms. In such examples, the second group of simulations may be based on the subset of simulations, such as in a parent (e.g., subset) child (e.g., second group) relationship. In any such example, the number of simulations in the second set may be equal to the number in the first set or group. In various examples, such mutations may be determined in accordance with various evolutionary and/or genetic algorithms.

In various examples, the simulation computing system may run simulations 108 with the second group of simulations determined at mutation 114. The simulation computing system may perform evaluation 110 and determine whether a particular simulation violates a limitation. Based on a determination that the simulations do not violate a limitation, the simulation computing system may perform the selection 112. Based on a determination that a particular simulation violates a limitation, the simulation computing system may perform termination 116 step. At termination 116, the simulation computing system may designate the particular simulation as an exemplary simulation. In various examples, the simulation computing system may send the exemplary simulation to another computing system and/or another component of the simulation computing system. The other computing system and/or other component may be configured to determine one or more actions for the vehicle to perform in the exemplary scenario. The actions may be determined, for example, using the methods, apparatuses and systems described in U.S. Pat. No. 10,133,275, the entire contents of which are incorporated herein by reference. Various stopping criteria are contemplated. If no simulation is found which violates a policy of the one or more policies 104, evaluations may continue for a number of generations, a number of iterations per generation, a number of steps per simulation, and the like.

Additionally, or in the alternative, the simulation computing device may utilize search algorithms such as a Monte Carlo Tree Search (MCTS), with neural network control policies to leverage machine learning and tree search to identify exemplary simulations. In some examples, the simulation computing system may utilize the MCTS, where each high-level option is represented by a learned control policy trained on a set of LTL formulas based on the environmental data. In such examples, a good tree search policy can be defined, for which two complementary levels of reinforcement learning are used. In some examples, prior information from expert demonstrations can be used to initialize this search with "good" high-level discrete action distributions. In still other examples, such an initialization of data can be from machine learning algorithms. In general, the simulation computing system may utilize a tree search algorithm such as MCTS to organize and search through possible simulations, while using temporal logic formulas, such as LTL formulas to verify whether the possible simulations violate a limitation.

In some instances, the MCTS can utilize any machine learning algorithms or neural networks. In addition to or in the alternative to the example discussed herein, one example of a neural network can include a convolutional neural network, or CNN. Each layer in a CNN can also comprise another CNN or can comprise any number of layers. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 2:
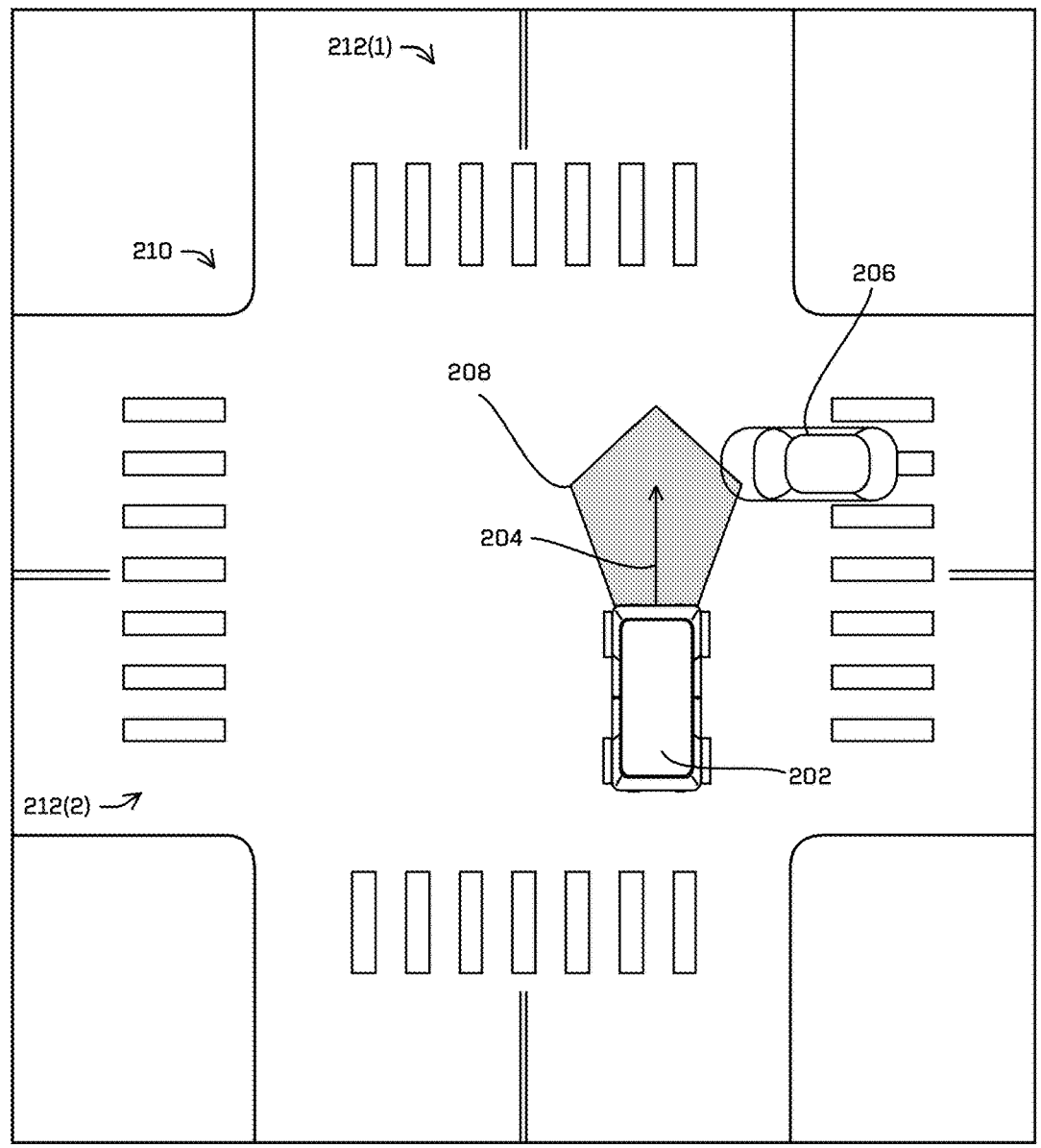
FIG. 2. illustrates an example environment for which temporal logic may be used to evaluate an exemplary simulation.

FIG. 2 illustrates an example environment 200 for which an exemplary simulation may be determined. In the illustrative example, a simulation computing system may receive environmental data including a four-way intersection 210 with each of the two intersecting roads 212(1) and 212(2) including one lane in either direction, such as that depicted in environment 200. The environmental data may include a vehicle 202 operating on a first road 212(1) in a direction corresponding to velocity vector 204 and located in the intersection. Additionally, the environmental data may include an object 206 (e.g., vehicle) operating on a second road 212(2), the second road 212(2) being perpendicular to the first road 212(1), with the object 206 approaching the intersection from the right (e.g., on a right side of the vehicle relative to the velocity vector 204).

In some examples, the environmental data may include a location of the object 206 in the environment 200. In various examples, the object 206 may be represented as a set of one or more points the object 206 occupies in a given simulation. In some examples, the point(s) may be defined according to a metric space associated with the simulation. In some examples, the point(s) may be defined according to coordinates (e.g., X, Y, Z values) in the environment 200 corresponding to the object 206. In some examples, the point(s) may be include abounding box (e.g., length, width, and/or height) representative of the object 206. In various examples, the environmental data may include a velocity and/or an acceleration associated with the object 206.

In various examples, the simulation computing system may receive a limitation associated with the operation of the vehicle. In some examples, the limitation may include a property that the vehicle 202 satisfies during operation. The limitation may be based on distance from an object 206, a region of distances 208 (e.g., a keep-out region 208) surrounding at least a portion of the vehicle 202, a type of object 206 (e.g., vehicle, pedestrian, bicyclist, etc.), velocity of the vehicle 202 and/or the object 206, and/or acceleration of the vehicle 202 and/or the object 206.

For example, a limitation may include the statement "the vehicle should not have a speed greater than 5 miles per hour with an object 206 present in the keep-out region in front of the vehicle 202." Accordingly, in the illustrative example, the forward speed of the vehicle should not be greater than 5 mph due in part to the object 206 being present in the keep-out region 208. Various components may be defined as sets, according to the following, in order to represent the statement in terms of temporal logic. For example, the set of states in which the vehicle is traversing the environment at a speed greater than 5 (units or mph, etc.), may be expressed as the set S(s):

$$[S(s)=\{x|x\in \mathbb{R} \wedge x>5\}] \quad (11)$$

Similarly, let K(s) comprise a function that gives a set of points in $\mathbb{R}^2$, $\mathbb{R}^3$, etc. specifying the keep-out region associated with the vehicle given the current simulation states, A(s) comprise the set of points in $\mathbb{R}^3$ occupied by an object in the simulation states, such as object 206, and V(s) comprises a velocity of the vehicle 202, given a simulation state s. As described above with respect to FIG. 1, the simulation computing system may utilize temporal logic to determine whether a simulation violates the limitation presented above. For example, an MI-LTL formula to determine limitation violations may be represented as:

$$[\neg F[K(s)\cap A(s)\neq 0] \wedge [S(s)\cap V(s)\neq 0]. \quad (12)$$

In various examples, the simulation computing system may iteratively determine simulations and cost functions associated therewith in accordance with any of the techniques defined herein. In some examples, the simulation computing system may continue iterations and/or generations until a particular simulation is identified in which a limitation is violated (e.g., an exemplary simulation). In some examples, the simulation computing system may perform a pre-determined number of iterations, generations, etc. In such examples, based on a failure to identify an exemplary simulation, the simulation computing device may adjust one or more aspects of the environmental data with the limitation and re-initialize, such as at initialization 106 step of FIG. 1. In various examples, the simulation computing system may continue to iteratively determine simulations and cost functions until one or more stopping criteria are reached (e.g., any one or more, or average, of a cost of 0 is identified, a cost has not changed by more than a threshold amount, a rate of change of the cost has not changed more than a threshold amount, or the like).

FIGS. 3-6 illustrate an example processes in accordance with embodiments of the disclosure. These processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 3:
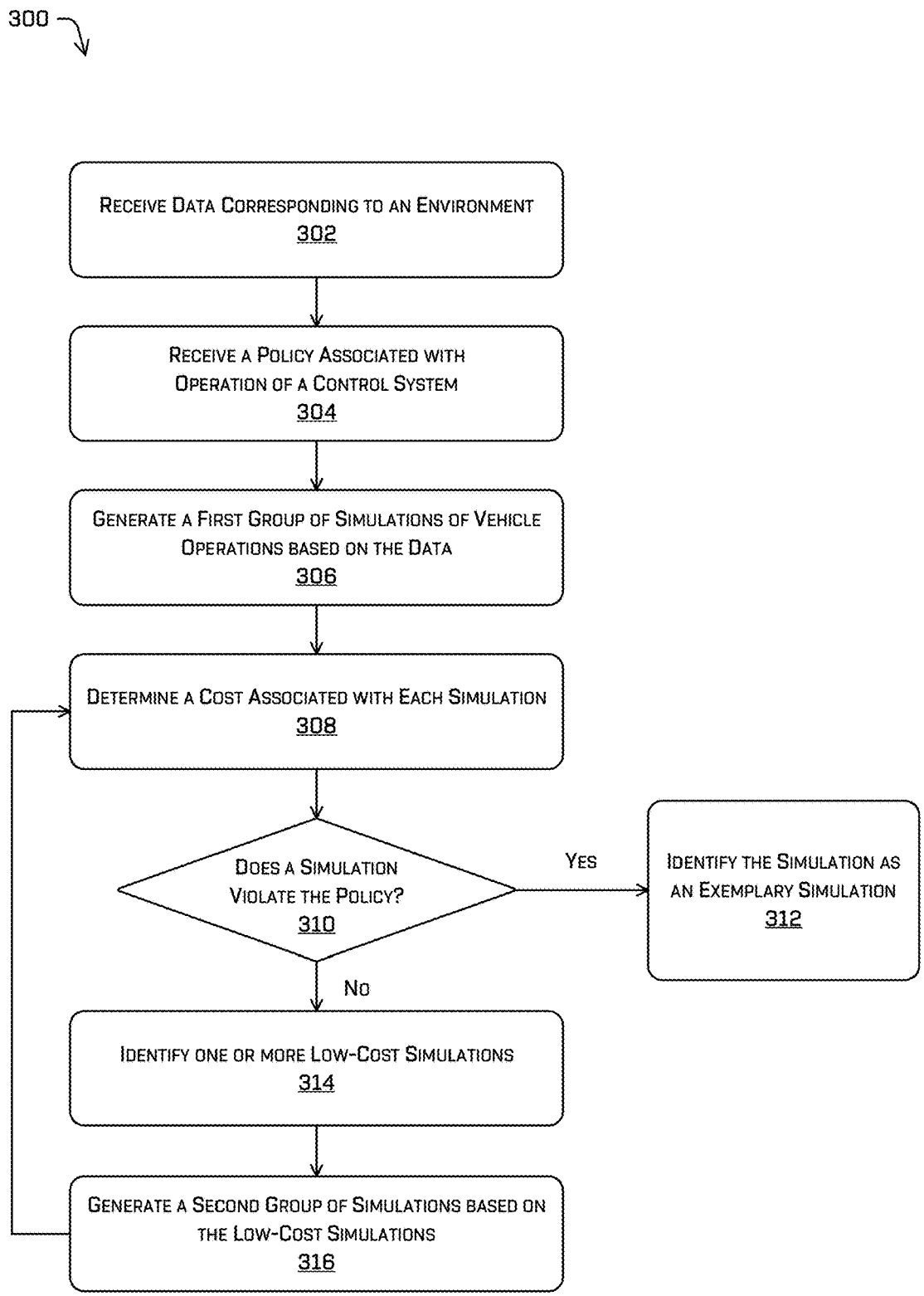
FIG. 3 depicts an example process for generating simulations and identifying an exemplary simulation.

FIG. 3 depicts an example process 300 for identifying an exemplary simulation (e.g., an example situation which may fail one or more policies) of an autonomous vehicle, as described herein. For example, some or all of the process 300 may be performed according to the flow 100, in the environment 200, and/or by the computing device(s) 704 or 728, as described herein.

At operation 302, the process may include receiving (and/or generating) data corresponding to an environment. The data may describe an environment in which a vehicle may operate. The data may include a location of the vehicle in a road, an intersection (e.g., four-way intersection, T-intersection, etc.), the size of a road (e.g., number of lanes, width of lanes, proximity of barriers, etc.), vehicle condition (e.g., tread on tires, brake pad wear, etc.), object condition (e.g., tread on tires, brake pad wear, etc.), a number of objects (e.g., other vehicles, motorcycles, pedestrians, bicyclists, etc.) present in the environment and/or attributes of the objects (size, position(s), orientation, velocity, acceleration, classification, appearance, etc.), weather considerations (e.g., rain, snow, sleet, etc.), road conditions (e.g., paved, gravel, potholes, wet, dry, oily, etc.), comfort of passengers, safety, rules of the road, rules of good driving, and other data related to the environment in which the vehicle operates.

At operation 304, the process may include receiving a policy (or limitation, constraint, etc.) associated with the operation of a control system (e.g., vehicle). The policy may include a property that the control system is required to satisfy during operation. The policy may be based on distance from an object, a region of distances (e.g., a keep-out region) surrounding at least a portion of the vehicle, a type of object (e.g., vehicle, pedestrian, bicyclist, etc.), velocity of the vehicle and/or the object, and/or acceleration of the vehicle and/or the object, or any other constraint, requirement, or otherwise associated with expected successful operation of the control system.

At operation 306, the process may include generating a first group of simulations of vehicle operations based on the data. In various examples, the first group of simulations may be generated by modifying any one or more of the environmental variables identified at operation 302 such as, but not limited to a position, a velocity, an acceleration, or other operating constraint associated with the vehicle and/or one or more objects in the environment. For example, a first simulation may include a vehicle approaching a four-way intersection at 25 miles per hour with dry road conditions, while a second simulation may include the vehicle approaching the four-way intersection at 25 miles per hour with damp road conditions.

At operation 308, the process may include determining a cost associated with each simulation. The cost may represent how close a simulation came to violating a policy. The cost may be determined using an incremental cost function, such that the closer a simulation comes to violating the limitation, the lower the cost associated therewith. For example, a simulation with a cost of zero (0) may violate a policy, though other formulations are contemplated which comprise higher costs associated with such a violation. In various examples, the simulation computing system may utilize temporal logic for determining the cost associated with each simulation (e.g., the recursive formulation identified herein). In at least one example, the simulation computing system may utilize metric-intersection linear temporal logic. Additionally, or in the alternative, the simulation computing device may utilize machine learning and/or tree search methods to determine the cost associated with each simulation.

At operation 310, the process may include determining whether a simulation violates the policy (e.g., cost associated therewith is zero, or otherwise maximizes a cost in those formulations). A determination that the simulation violates the limitation may be based on a determination that the vehicle and an object occupy the same metric space.

Based on a determination that a simulation violates the limitation (e.g., "Yes" at 310), the process may include, at operation 312, identifying the simulation as an exemplary simulation. In various examples, the simulation computing system may send the exemplary simulation to a vehicle planning component and/or computing system to identify one or more actions for the vehicle to take in the exemplary simulation. In at least some examples, the exemplary simulation may be used to indicate how one or more portions of programmatic logic may be altered in order to ensure that such a violation does not occur.

Based on a determination that a particular simulation does not violate the limitation (e.g., "No" at 310), the process may include, at operation 314, identifying one or more low-cost simulations (e.g., simulations that come closest to violating the limitation). In various examples, the low-cost simulation(s) may include simulations that have a cost below a threshold cost. In some examples, the low-cost simulation(s) may include simulations that represent a pre-determined number and/or percentage of simulations with the lowest cost (e.g., bottom 10, bottom 15%, etc.). The simulations identified at operation 314 may represent a subset of the first group of simulations. In various examples, the simulations that come closest to violating the limitation may include those with respective highest costs with respect to one another (e.g., top 10, top 20%, etc.).

At operation 316, the process may include generating a second group of simulations based on the low-cost simulations (e.g., subset of the first group of simulations). In some examples, the second group of simulations may be generated using one or more evolutionary algorithms. In some examples, the second group of simulations may be generated by perturbing one or more aspects of each simulation of the subset of the first group of simulations and/or adding in a random attribute. In at least some examples, the number of simulations in each group may remain constant (e.g., the number of simulations in the first and second group are equivalent), though any other ratio is contemplated (more or less in subsequent generations).

Based on the generation of the second group, the simulation computing device may determine a cost associated with each simulation of the second group of simulations, such as that described with respect to operation 308. In some examples, the simulation computing device may iteratively perform the operations 308, 310, 314, and 316 until a simulation is determined to violate the limitation at operation 310. In some examples, the simulation computing device may iteratively perform operations 308, 310, 314, and 316 until it has performed a pre-determined number of iterations. In some examples, the simulation computing device may iteratively perform operations 308, 310, 314, and 316 until the lowest cost simulation is less than a threshold amount lower than a lowest cost simulation from a previous iteration. As above, any number of stopping criteria may otherwise be evaluated to determine whether or not a violation of a policy has occurred.

Figure 4:
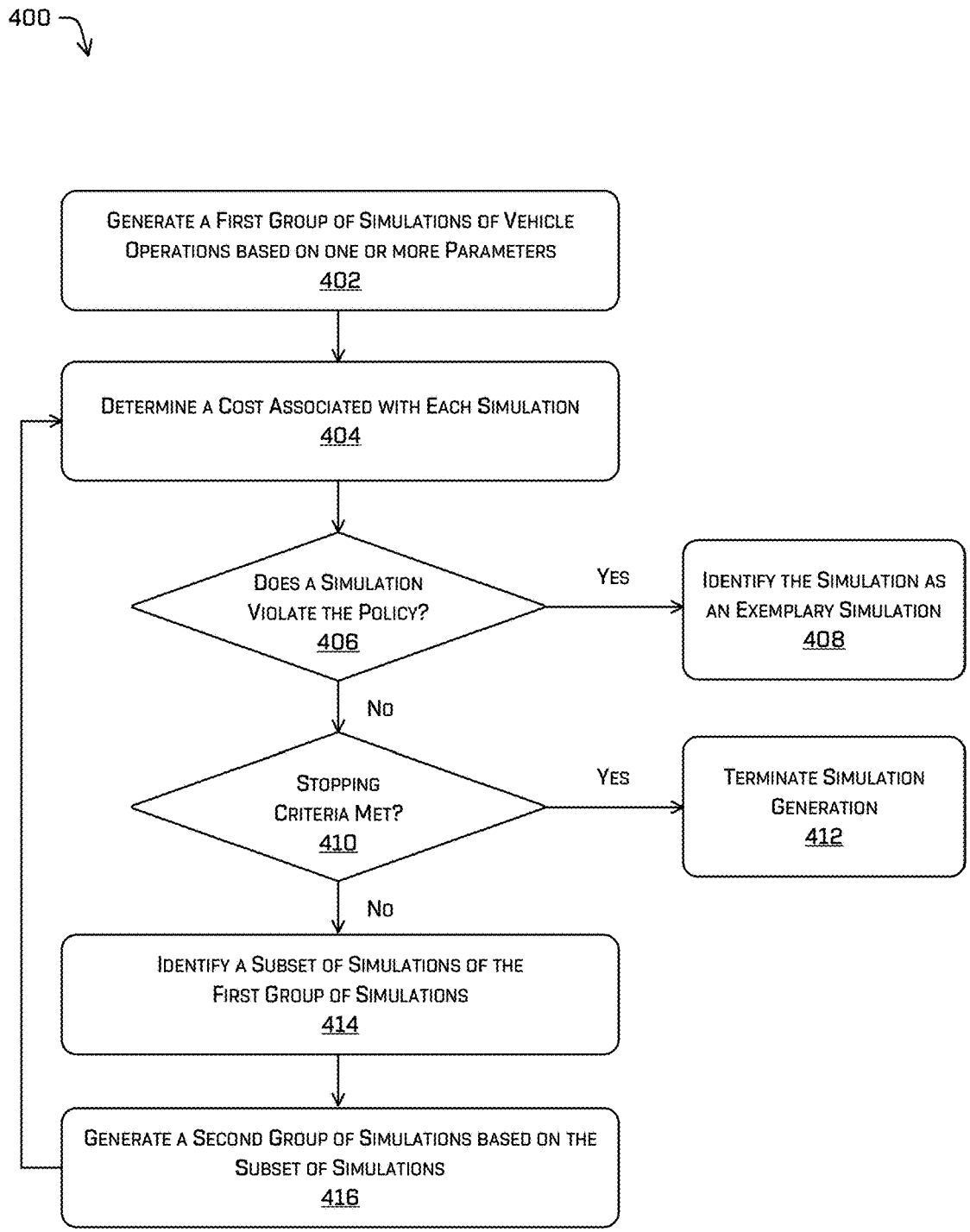
FIG. 4 depicts an example process for identifying an exemplary simulation.

FIG. 4 depicts an example process 400 for identifying an exemplary simulation of a vehicle, as described herein. For example, some or all of the process 400 may be performed according to the flow 100, in the environment 200, and/or by the computing device(s) 704 or 728, as described herein.

At operation 402, the process may include generating a first group of simulations based on one or more parameters. The parameter(s) may include any quantifiable aspect of a simulation that can be modified. The parameter(s) may include on environmental data associated with an environment in which the vehicle may operate. The environmental data may include a location of the vehicle in a road, an intersection, the size of a road, a number of objects present in the environment and/or attributes of the objects, weather considerations, road conditions, safety, rules of the road, rules of good driving, and other data related to the environment in which the vehicle may operate. In various examples, the parameter(s) may be based at least in part on a policy (or limitation, constraint, etc.) the vehicle (e.g., control system thereof) is required to satisfy during operation. The policy may include a distance from an object, a region of distances surrounding at least a portion of the vehicle, a type of object, velocity of the vehicle and/or the object, and/or acceleration of the vehicle and/or the object, or any other constraint, requirement, or otherwise associated with expected successful operation of the control system. In some examples, the parameter(s) may include one or more parameters of a controller, such as a proportional-integral-derivative (PID) controller. In such examples, the parameter(s) may represent a gain (e.g., proportional gain, integral gain, derivative gain, etc.) utilized in a PID control scheme.

At operation 404, the process may include determining a cost associated with each simulation. The cost may represent how close a simulation came to violating the policy. The cost may be determined using an incremental cost function, such that the closer a simulation comes to violating the limitation, the lower the cost associated therewith. For example, a simulation with a cost of zero (0) may violate a policy, though other formulations are contemplated which comprise higher costs associated with such a violation. In various examples, the simulation computing system may utilize temporal logic for determining the cost associated with each simulation (e.g., the recursive formulation identified herein). In at least one example, the simulation computing system may utilize metric-intersection linear temporal logic. Additionally, or in the alternative, the simulation computing device may utilize machine learning and/or tree search methods to determine the cost associated with each simulation.

At operation 406, the process may include determining whether a simulation violates the policy (e.g., cost associated therewith is zero, (or otherwise comes within some threshold (epsilon)), or otherwise optimizes a cost in those formulations). A determination that the simulation violates the limitation may be based on a determination that the vehicle and an object occupy the same metric space.

Based on a determination that a particular simulation violates the limitation (e.g., "Yes" at 406), the process may include, at operation 408, identifying the particular simulation as an exemplary simulation. In various examples, the simulation computing system may send the exemplary simulation to a vehicle planning component and/or computing system to identify one or more actions for the vehicle to take in the exemplary simulation. In at least some examples, the exemplary simulation may be used to indicate how one or more portions of programmatic logic may be altered in order to ensure that such a violation does not occur.

Based on a determination that none of the first group of simulations violates the limitation (e.g., "No" at 406), at operation 410, the process may include determining whether a stopping criteria is met. The stopping criteria may include a determination that the simulation computing system has generated a threshold number of generations and/or a threshold number of iterations (e.g., 30, 67, 120, etc.) (e.g., per generation) performed without identifying an exemplary simulation, a cost associated with a simulation being at or below a first threshold and/or meeting or exceeding a second threshold, a change (e.g., difference) in cost between simulations of different sets being less than a threshold amount and/or less than a threshold rate of change of the cost, or the like. For example, a rate of change of the lowest cost associated with the fifth set of simulations and the sixth set of simulations is less than a threshold rate of change between consecutive simulations required to continue iteratively generating simulations.

Based on a determination that one or more stopping criteria are met (e.g., "Yes" at 410), the process may include, at operation 412, terminating the simulation generation associated with the environmental data and the policy.

Based on a determination that one or more stopping criteria are not met (e.g., "No" at 410), at operation 414, the process may include identifying a subset of simulations of the first group of simulations. In some examples, the subset of simulations may be based on the cost associated with each simulation of the first group of simulations, such as that determined at operation 404. In some examples, the sub-set of simulations may include the simulations of the first group of simulations with a cost below a threshold cost. In some examples, the subset of simulations may include a number of simulations (e.g., 10, 13, 15, etc.) and/or a percentage of simulations (e.g., 5%, 10%, 15%, etc.) of the first group of simulations with the lowest cost. In such examples, the simulation computing system may rank the simulations of the first group of simulations based on cost and select the simulations corresponding to the lowest cost. In some examples, the subset of simulations of the first group of simulations may be identified based on maximizing a cost associated with the simulations. In such examples, the subset of simulations of the first group of simulations may be identified based on the aforementioned criteria (threshold value, number, percentage, etc.) being applied to simulations with the highest calculated costs.

At operation 416, the process may include generating a second group of simulations based on the subset of simulations (e.g., subset of the first group of simulations). In some examples, the second group of simulations may be generated using one or more evolutionary algorithms. In some examples, the second group of simulations may be generated by perturbing one or more aspects of each simulation of the subset of simulations of the first group of simulations and/or adding in a random attribute. In at least some examples, the number of simulations in each group may remain constant (e.g., the number of simulations in the first and second group are equivalent), though any other ratio is contemplated (more or less in subsequent generations). In at least various examples, various aspects of the one or more initialization parameters from one group may be mixed (cross-bred) with one or more additional scenarios to generate the new group of scenarios for testing.

Based on the generation of the second group, the simulation computing device may determine a cost associated with each simulation of the second group of simulations, such as that described with respect to operation 404. In some examples, the simulation computing device may iteratively perform the operations 404, 406, 410, 414 and 416 until a simulation is determined to violate the policy at operation 406 or the stopping criteria is determined to be met at operation 410.

Figure 5:
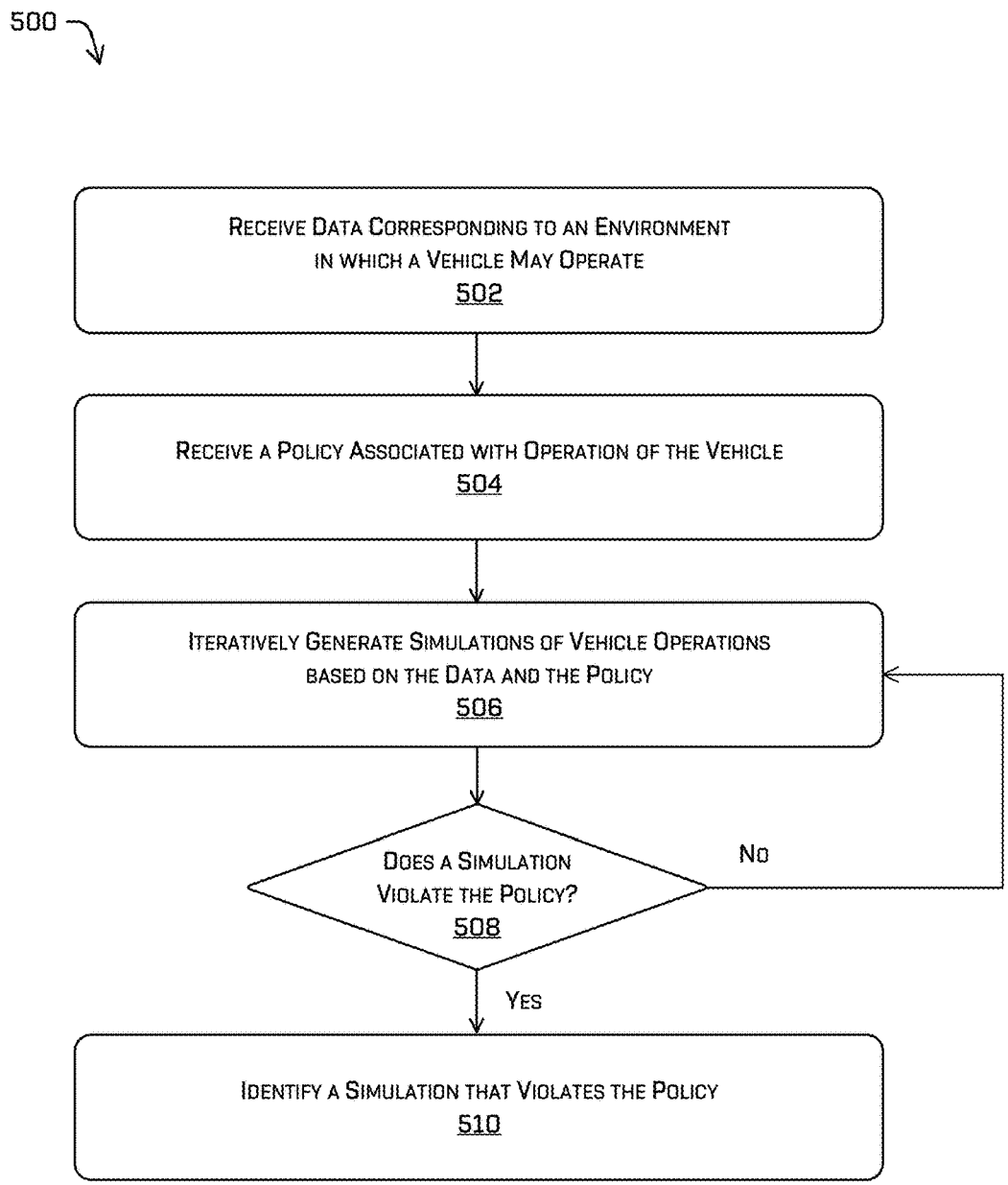
FIG. 5 depicts another example process for identifying an exemplary simulation.

FIG. 5 depicts an example process 500 for identifying an exemplary simulation of a vehicle, as described herein. For example, some or all of the process 500 may be performed according to the flow 100, in the environment 200, and/or by the computing device(s) 704 or 728, as described herein.

At operation 502, the process may include receiving data corresponding to an environment in which the vehicle may operate. In some examples, a computing system, such as the simulation computing system described above, may generate the data corresponding to the environment. The data may include a location of the vehicle in a road, an intersection, the size of a road, a number of objects present in the environment and/or attributes of the objects, weather considerations, road conditions, safety, rules of the road, rules of good driving, and other data related to the environment in which the vehicle operates.

At operation 504, the process may include receiving a policy (or limitation, constraint, etc.) associated with the operation of the vehicle (e.g., control system). The policy may include a property that the control system of the vehicle is required to satisfy during operation. The policy may be based on distance from an object, a region of distances surrounding at least a portion of the vehicle, a type of object, velocity of the vehicle and/or the object, and/or acceleration of the vehicle and/or the object, or any other constraint, requirement, or otherwise associated with expected successful operation of the control system.

At operation 506, the process may include iteratively generating simulations of vehicle operations based on the data and the policy. The simulations may represent potential scenarios the vehicle and the object may encounter in the environment. A simulation may include the location, one or more velocities and/or acceleration(s) of the vehicle, and a location of an object, a set of one or more points representative of a space the object may occupy in the environment, a velocity and/or acceleration associated with the object.

In various examples, the simulation computing system may generate a first set of simulations representative of vehicle and object operations in the environment. The simulation computing system may determine a cost associated with each simulation of the first set of simulations. As discussed above, the cost may represent how close a particular simulation comes to violating the policy. In various examples, the simulation computing system may determine the cost using a cost function defined by temporal logic. In at least one example, the temporal logic may include linear temporal logic, such as MI-LTL.

In some examples, the simulation computing system may identify a subset of the first set of simulations having a lowest cost. In some examples, the simulation computing system may identify a set number of simulations (e.g., 10 lowest cost simulations, 15 lowest cost simulations, lowest 10% of the simulations, etc.). In some examples, the simulation computing system may identify the subset of simulations based on a threshold cost. In such examples, the simulations of the first set of simulations having a cost at or below the threshold cost may be identified as the subset of simulations. As a note, though simulations are selected with respect to costs closest to zero, similar formulations are contemplated in which a cost is to be maximized (e.g., in those examples in which costs for violating policies increase with respect to how close a policy is violated).

The simulation computing system may generate a second set of simulations based on the subset of simulations identified based on the cost. In various examples, the second set of simulations may be generated using one or more evolutionary algorithms. For example, for a given set size, n, one or more combinations of the second set may be combined (in addition to an amount of randomization) to generate a second generation which has the same set size, n. Such evaluations, refinement, and the like may continue for a set number of generations (M), a set number of iterations per generation, one or more stopping criteria are reached (e.g., any one or more, or average, of a cost of 0 (or within a threshold) is identified, a cost has not changed by more than a threshold amount, a rate of change of the cost has not changed more than a threshold amount, and the like). Similar to the determination described above, the simulation computing system may utilize temporal logic to determine whether a simulation violates a limitation (e.g., has a cost if zero, or a maximum cost).

In various examples, the simulation computing system may iteratively generate simulations and sets thereof until the simulation computing system identifies an exemplary simulation (e.g., a simulation in which a limitation is violated). In some examples, the simulation computing system may iteratively generate simulations until one or more stopping criteria are met. The stopping criteria may include a generation of a threshold number of generations and/or a threshold number of iterations (e.g., 25, 55, 100, etc.) (e.g., per generation) performed without identifying an exemplary simulation, a cost associated with a simulation being at or below a first threshold and/or meeting or exceeding a second threshold, a change (e.g., difference) in cost between simulations of different sets being less than a threshold amount and/or less than a threshold rate of change of the cost, or the like. For example, a lowest cost identified in a fourth set of simulations is 0.40000 and a lowest cost identified in a fifth set of simulations is 0.39999. The simulation computing system may determine that the difference in cost of 0.00001 is less than a threshold amount required to continue iteratively generating simulations. Based on a determination to stop calculations, the simulation computing device may terminate generating simulations based on the policy and/or environmental data.

At operation 508, the process may include determining whether a simulation violates the policy. Based on a determination that no simulation violates the policy ("No" at operation 508), the simulation computing system may continue to iteratively generate simulations at operation 506. In some examples, the simulation computing system may continue to iteratively generate simulations until a stopping criteria, such as that described above, is met or based on a determination that a simulation violates the policy ("No" at operation 508), the process may include, at operation 510, identifying a simulation that violates the policy (e.g., exemplary simulation). The simulation may be identified based on a calculated cost function associated therewith having a value of zero.

Figure 6:
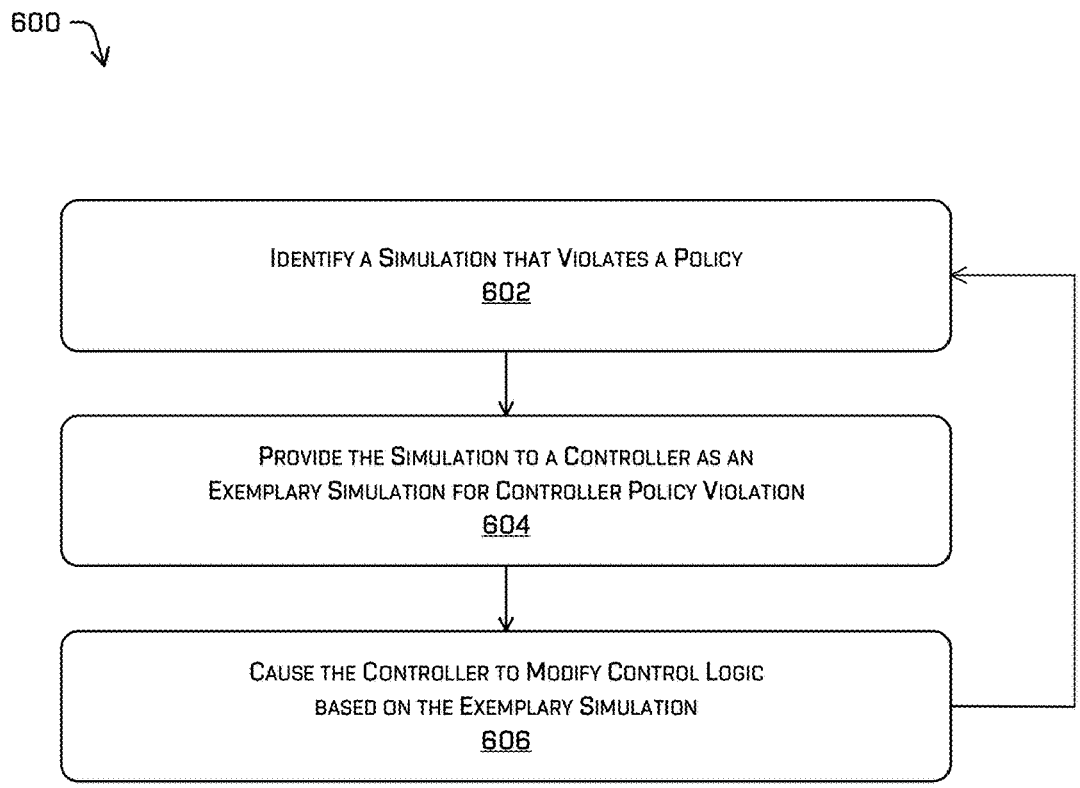
FIG. 6 depicts an example process for providing an exemplary simulation to a controller component and causing a modification to control logic.

FIG. 6 depicts an example process 600 for providing an exemplary simulation to a controller component and causing a modification to control logic, as described herein. For example, some or all of the process 600 may be performed according to the flow 100, in the environment 200, and/or by the computing device(s) 704 or 728, as described herein.

At operation 602, the process may include identifying a simulation that violates a policy. The policy may include a property a control system of the vehicle is required to satisfy. As discussed above, a simulation computing device may identify the simulation after iteratively generating simulations using one or more evolutionary algorithms until the simulation computing device identifies a simulation with a cost function of zero.

At operation 604, the process may include providing the simulation to a controller as an exemplary simulation for controller policy violation. The controller may include a component of a simulation computing device and/or vehicle computing device configured to determine actions for a vehicle to take while operating in an environment. In some examples, the controller may be coupled to and/or be a part of a planner component of a vehicle computing device. The controller may include programmatic logic (e.g., control logic) used to determine vehicle actions based at least in part on environmental data. In some examples, the programmatic logic may include one or more control algorithms, such as those used by a system controller to control the vehicle. For example, the controller may include one or more algorithms designed to determine actions for a vehicle to take responsive to detecting a pedestrian in a road (e.g., yielding logic).

At operation 606, the process may include causing the controller to modify control logic (e.g., programmatic logic) based on the exemplary simulation. In some examples, the simulation computing system may cause the controller to modify the one or more programmatic logic statements of the control system. In some examples, the simulation computing system may send an instruction (to the controller) to modify the control system substantially concurrently with the exemplary simulation. In some examples, the controller may be programmed to automatically modify the control system based on receipt of the exemplary simulation and the data associated therewith. In some examples, responsive to receiving the exemplary simulation, the controller may automatically modify the programmatic logic. In various examples, the controller may utilize one or more evolutionary algorithms to modify the programmatic logic statement(s) (e.g., debug logic statements), such as described in "A Systematic Study of Automated Program Repair: Fixing 55 out of 105 Bugs for $8 Each," by Le Goues, et. al., which is incorporated herein by reference. In such examples, the controller may determine one or more faults and/or fault locations in the programmatic logic based on one or more parameters associated with the exemplary simulation. In some examples, the controller may determine a fix (e.g., repair) to the fault. In some examples, the controller may apply the fix to the fault.

In some examples, the controller may send the identified fault, fault location, and/or fix to a programmer to verify the fix and/or modify the programmatic logic. In some examples, the programmatic logic may be manually modified based on the exemplary simulation. In various examples, responsive to a modification of the programmatic logic, the simulation computing system may determine whether the modification successfully solved the fault in the programmatic logic. In such examples, the simulation computing system may iteratively generate simulations using the modified logic to determine whether a simulation violates the limitation.

In various examples, after causing the controller to update (modify) the control logic, the simulation computing device may loop back to operation 602 and identify a second simulation that violates the policy. In some examples, responsive to identifying a first simulation that violates a first policy, the simulation computing device may identify a second simulation that violates a second (different) policy.

Figure 7:
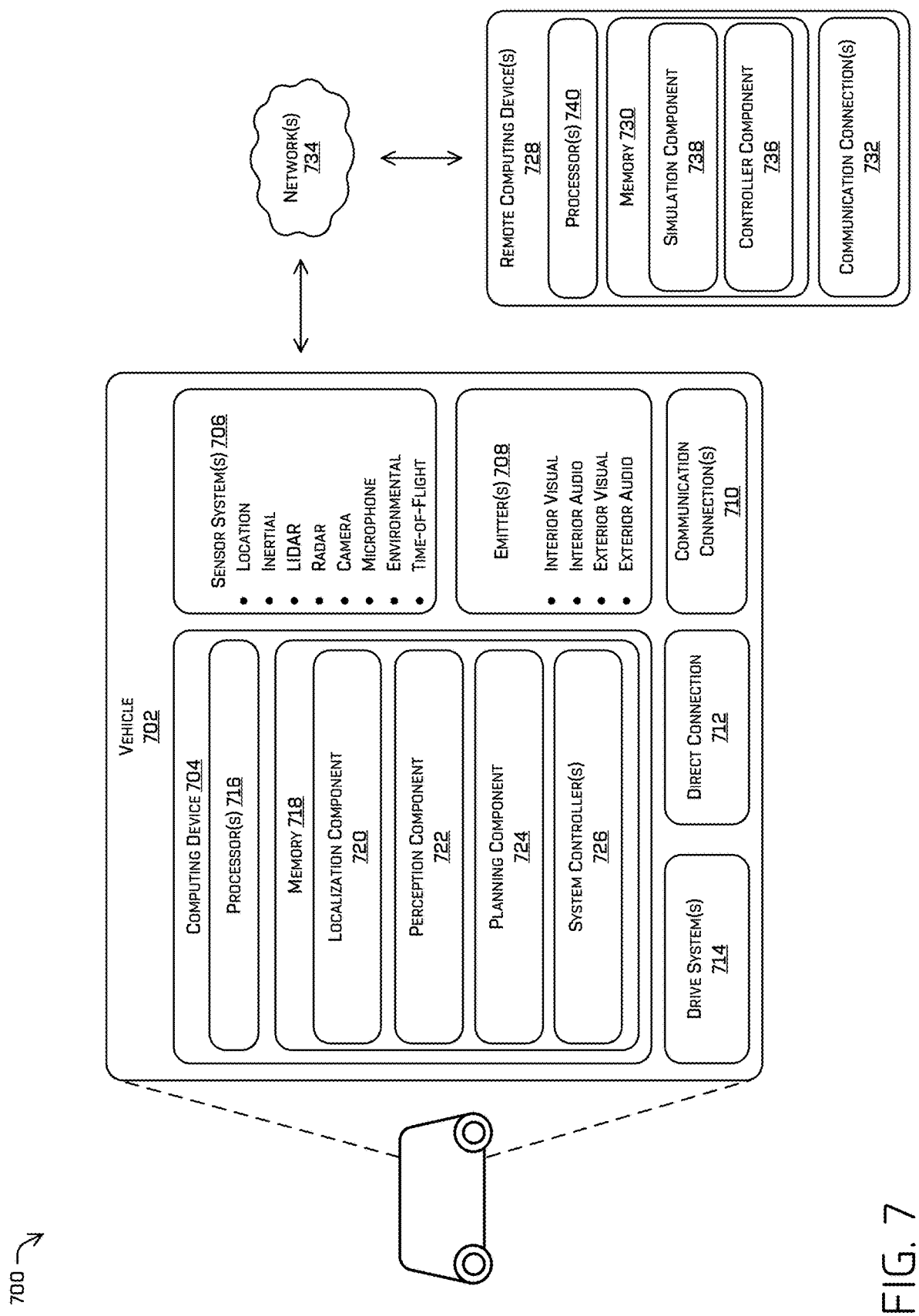
FIG. 7 depicts a block diagram of an example computing system for implementing the techniques described herein.

FIG. 7 illustrates a system 700 in which the disclosures may be implemented in whole or in part. In at least one example, the system 700 may include a vehicle 702. The vehicle 702 may include a computing device 704, one or more sensor systems 706, one or more emitters 708, one or more communication connections 710, at least one direct connection 712, and one or more drive systems 714. In some examples, the computing device 704 and/or the remote computing device(s) 728 may include a simulation computing device, such as that described above with respect to FIGS. 1-6.

The computing device 704 may include one or more processors 716 and memory 718 communicatively coupled with the one or more processors 716. In the illustrated example, the vehicle 702 is an autonomous vehicle; however, the vehicle 702 could be any other type of vehicle. In the illustrated example, the memory 718 of the computing device 704 stores a localization component 720, a perception component 722, a planning component 724, and one or more system controllers 726. Though depicted in FIG. 7 as residing in memory 718 for illustrative purposes, it is contemplated that the planning component 724 may additionally, or alternatively, be accessible to the vehicle 702 (e.g., stored remotely, such as in one or more remote computing devices 728).

In at least one example, the localization component 720 may include functionality to receive data from the sensor system(s) 706 to determine a position of the vehicle 702. For example, the localization component 720 may include a three-dimensional map of an environment and may continuously determine a location of the autonomous vehicle within the map. In some instances, the localization component 720 may utilize SLAM (simultaneous localization and mapping) or CLAMS (calibration, localization and mapping, simultaneously) to receive image data, LIDAR data, RADAR data, IMU data, GPS data, and the like to accurately determine a location of the autonomous vehicle.

In some instances, the perception component 722 may include functionality to perform object detection, segmentation, and/or classification. In some examples, the perception component 722 may provide processed sensor data that indicates a presence of an entity that is proximate to the vehicle 702 and/or a classification of the entity as an entity type (e.g., car, pedestrian, cyclist, unknown, etc.). In additional and/or alternative examples, the perception component 722 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, etc. Characteristics associated with the environment may include, but are not limited to, a presence of another entity in the environment, a state of another entity in the environment, a time of day, a day of a week, a season, a weather condition, an indication of darkness/light, or other environmental data as described herein.

In general, the planning component 724 may determine a path for the vehicle 702 to follow to traverse through an environment. In at least one example, the vehicle computing device 704 may include one or more system controllers 726, which may be configured to control steering, propulsion, braking, safety, emitters, communication, and other systems of the vehicle 702. These system controller(s) 726 may communicate with and/or control corresponding systems of the drive system(s) 714 and/or other components of the vehicle 702.

In some instances, aspects of some or all of the components discussed herein may include any models, algorithms, and/or machine learning algorithms. For example, in some instances, the components in one or both of the memory 718 and memory 730 of the remote computing device(s) 728 may be implemented as a neural network, such as those described above with regard to FIG. 1.

In at least one example, the sensor system(s) 706 may include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the LIDAR sensors may include individual LIDAR sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally or alternatively, the sensor system(s) 706 may send sensor data, via the one or more networks 734, to the one or more remote computing devices 728 at a particular frequency, after a lapse of a predetermined period of time, in near real-time, etc.

The vehicle 702 may also include one or more emitters 708 for emitting light and/or sound, as described above. The emitter(s) 708 in this example include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles.

The vehicle 702 may also include one or more communication connection 710 that enable communication between the vehicle 702 and one or more other local or remote computing device(s) 728. Similarly, the remote computing device(s) 728 may include one or more communication connections 732 that enables communication between the remote computing device(s) 728 and one or more other computing devices, such as computing device 704. In some examples, the communication connection(s) 710 may facilitate communication with other local computing device(s) on the vehicle 702 and/or the drive system(s) 714. In some examples, the communication connection(s) 732 may facilitate communication between the one or more remote computing devices 728, such as those configured as a distributed computing network. Also, the communication connection(s) 710 and 732 may allow the vehicle 702 and/or remote computing device(s) 728 to communicate with other nearby computing device(s) (e.g., other nearby vehicles, traffic signals, etc.). The communications connection(s) 710 and 732 also enable the vehicle 702 and/or remote computing device(s) 728 to communicate with a remote teleoperations computing device or other remote services.

The communications connection(s) 710 and 732 may include physical and/or logical interfaces for connecting the vehicle computing device 704 and/or remote computing device(s) 728 to another computing device or a network, such as network(s) 734. For example, the communications connection(s) 710 and 732 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) 706 may include one or more wheel encoders (e.g., rotary encoders) to sense rotation of the wheels of the drive system(s) 714, inertial sensors (e.g., inertial measurement units, accelerometers, gyroscopes, magnetometers, etc.) to measure orientation and acceleration of the drive system(s) 714, cameras or other image sensors, ultrasonic sensors to acoustically detect objects in the surroundings of the drive system(s) 714, LIDAR sensors, RADAR sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive system controller (e.g., programmatic logic-based controller) which may receive and preprocess data from the sensor system(s) and to control operation of the various vehicle systems. In various examples, the drive system(s) 714 may be configured to receive one or more control system updates from a controller component 736 on the remote computing device(s) 728. In such examples, the controller component 736 may provide updated control system algorithms and/or other control system updates based at least in part on input from a simulation component 738, such as one or more exemplary simulations, as described herein.

In some examples, the drive system controller may include one or more processors and memory communicatively coupled with the one or more processors. The memory may store one or more modules to perform various functionalities of the drive system(s) 714. Furthermore, the drive system(s) 714 also include one or more communication connection(s) that enable communication by the respective drive system with one or more other local or remote computing device(s).

The processor(s) 716 of the vehicle 702 and processor(s) 740 of the remote computing device(s) 728 may be any suitable processor capable of executing instructions to process data and perform operations as described herein. By way of example and not limitation, the processor(s) 716 and 740 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memories 718 and 730 are examples of non-transitory computer-readable media. The memories 718 and 730 may store an operating system and one or more software applications, instructions, programs, and/or data to implement the methods described herein and the functions attributed to the various systems. In various implementations, the memories 718 and 730 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

The memory 730 of the remote computing device(s) 728 may include the simulation component 738 and/or the controller component 736. Although illustrated as separate components, the functionality of the simulation component 738 and the controller component 736 may be combined into a single component or divided into additional components.

The simulation component 738 may be configured to generate one or more simulations to identify a violation of a limitation (e.g., property that a controller, such as that included in drive system(s) 714, is required to satisfy). As discussed above, the simulation component 738 may receive environmental data corresponding to a particular scenario in an environment that is being tested to identify the violation. The environmental data may include characteristics associated with the environment, parameters associated with a vehicle and/or an object in the environment, or the like. In the example of the autonomous vehicle 702, the environmental data 102 may include a location of the vehicle in a road, an intersection, the size of a road, vehicle condition, object condition, a number of objects present in the environment, relative sizes of the objects, relative positions of the objects, relative velocities (linear and/or rotational) of the objects, accelerations of the objects, object classification, weather considerations, road conditions, comfort of passengers, safety, rules of the road, rules of good driving, and other data related to the environment in which the vehicle operates.

In various examples, the simulation component 738 may generate a first group of simulations based at least in part on the environmental data. The first group of simulations may include a predetermined number (e.g., 100, 150, etc.) of simulations. The first group of simulations may include parameters associated with a vehicle and/or an object (e.g., dynamic object) in the environment. For example, the parameters may include a set of points (X/Y/Z) corresponding to a location of a dynamic object in the environment. For another example, the parameters may include a set of points associated with a vehicle, such as vehicle 702, that correspond to a region in which the dynamic object may not enter (e.g., keep-out region), such as that determined based on the limitation. In various examples, the keep-out region may be determined based at least in part on a classification associated with the dynamic object. In such examples, the keep-out region associated with a vehicle simulated in an environment with a pedestrian may be different from a second keep-out region associated with the vehicle simulated in the environment with another vehicle. Of course, any other parameters are contemplated (e.g., velocities, accelerations, extents, kinematics, controls, etc.).

In various examples, the simulation component 738 may determine a cost associated with each simulation in the first group of simulations. The cost may be determined utilizing a cost function. In some examples, the cost function may be defined utilizing temporal logic (e.g., linear temporal logic, such as metric-intersection linear temporal logic, signal temporal logic, or the like). In various examples, the cost function may represent an amount or "distance" that a simulation is from violating the limitation. In at least one example, a simulation with a cost of zero may represent an exemplary simulation that violates the limitation.

In various examples, the simulation component 738 may identify a first subset of simulations (e.g., one or more simulations) of the first group of simulations based on costs associated with each of the simulations. In some examples, the first subset of simulations may include those that are associated with a low cost. The low cost may be determined based on a predetermined number and/or percentage of lowest cost simulations and/or simulations that have an associated cost below a threshold cost. In various examples, the simulation component 738 may rank the simulations of the first group of simulations based on the cost. In such examples, the ranking may be used to determine the subset of simulations.

Based on a determination that no simulation violates the limitation (e.g., costs associated with the simulations greater than zero), the simulation component 738 may generate a second group of simulations. The second group of simulations may be generated using one or more evolutionary algorithms. In various examples, the simulation component 738 may modify one or more parameters associated with the subset of simulations and/or select random parameters from scenarios of the first group to generate the second group of simulations. The second group of simulations may include a same or a different number of simulations as the first group of simulations.

In various examples, the second group of simulations may include simulations in which one or more parameters associated with the simulations of the subset of simulations are adjusted. The parameters may include position and/or points associated with a position of the vehicle, such as vehicle 702, a position and/or points associated with a position of an object, a velocity of the vehicle and/or the object, an acceleration of the vehicle and/or the object, a weather condition associated with the environment, a vehicle condition, an object condition, and/or a gain (e.g., proportional gain, integral gain, derivative gain, etc.) utilized in a control scheme of a drive system (or controller associated therewith), such as the drive system(s) 714, utilized in a PID control scheme.

The simulation component 738 may determine a cost associated with each simulation of the second group of simulations. The simulation component 738 may then identify a second subset of simulations based on the costs. In some examples, the second subset of simulations may include simulations of the second group of simulations that are associated with a low cost. The low cost may be determined based on a predetermined number and/or percentage of lowest cost simulations and/or simulations that have an associated cost below a threshold cost. In various examples, the simulation component 738 may rank the simulations of the second group of simulations based on the cost. In such examples, the ranking may be used to determine the second subset of simulations. (e.g., in which those scenarios (or random subset) closest to violating a policy are selected as the seeds for a subsequent generation).

In various examples, the simulation component 738 may be configured to iteratively generate groups of simulations, and determine costs associated with individual simulations of the groups of simulations until one or more stopping criteria are met. The stopping criteria may include a determination that the simulation computing system has generated a threshold number of generations and/or a threshold number of iterations (e.g., 45, 75, 150, etc.) (e.g., per generation) performed without identifying an exemplary simulation, a cost associated with a simulation being at or below a first threshold and/or meeting or exceeding a second threshold, a change (e.g., difference) in cost between simulations of different sets being less than a threshold amount and/or less than a threshold rate of change of the cost, or the like. In some examples, the simulation component 738 may be configured to iteratively generate groups of simulations, and determine costs associated with individual simulations of the groups of simulations until the simulation component 738 identifies a simulation with a cost of zero (e.g., simulation that violates the limitation).

Based on a determination that a simulation violates the limitation, (e.g., has a cost of zero—or within a threshold, epsilon), the simulation component 738 may identify the simulation as an exemplary simulation and may provide the exemplary simulation to the controller component 736. In various examples, the simulation component 738 may send the exemplary simulation to the controller component 736 with an instruction to update one or more control policies (e.g., algorithms) for controlling a vehicle, such as vehicle 702. In some examples, the controller component 736 may automatically update the control policies based at least in part on receiving the exemplary simulation from the simulation component 738. In various examples, an update to the control policies may be performed, at least in part, manually based on input from a programmer.

In various examples, based on a determination that one or more control policies have been updated, the controller component 736 may send the updated control policies to the system controller(s) 726 and/or the drive system(s) 714, for implementation on the vehicle 702.

Additionally, or in the alternative, the simulation component 738 may utilize search algorithms, such as a Monte Carlo Tree Search (MCTS), with neural network control policies to leverage machine learning and tree search to identify exemplary simulations. In some examples, the simulation component 738 may utilize the MCTS, where each high-level option is represented by a learned control policy trained on a set of LTL formulas based on the environmental data. In such examples, a good tree search policy can be defined, for which two complementary levels of reinforcement learning are used. In some examples, prior information from expert demonstrations can be used to initialize this search with "good" high-level discrete action distributions. In still other examples, such an initialization of data can be from machine learning algorithms. In general, the simulation component 738 may utilize a tree search algorithm such as MCTS to organize and search through possible simulations, while using temporal logic formulas, such as LTL formulas to verify whether the possible simulations violate a limitation

EXAMPLE CLAUSES

A: A system for identifying a simulation for a programmatic logic-based controller, the system comprising: one or more processors; and one or more computer-readable media storing instructions executable by the one or more processors, wherein the instructions, when executed, cause the system to perform operations comprising: identifying data associated with a parameter for instantiating the simulation of the controller; receiving a limitation corresponding to a property that the controller is required to satisfy; generating a first group of simulations based at least in part on the data associated with the parameter; determining, based at least in part on one or more temporal logic formulas, a cost for a simulation of the first group of simulations; identifying a subset of simulations of the first group of simulations, the subset of simulations being associated with costs at or below a threshold cost; generating a second group of simulations based at least in part on the subset of simulations; identifying, using the one or more temporal logic formulas, a simulation of the second group of simulations as an exemplary simulation based at least in part on a determination that the simulation of the second group of simulations violates the limitation; and providing the exemplary simulation to the controller for controller policy violation.

B: A system as paragraph A describes, wherein generating the second group of simulations comprises: applying one or more evolutionary algorithms to the subset of simulations.

C: A system as either paragraph A or B describe, wherein generating the second group of simulations comprises varying characteristics associated with the subset of simulations, the characteristics comprising at least one of: a position of an object; a velocity of the object; a gain associated with the controller; a weather condition; an object condition; or a vehicle condition.

D: A system as any one of paragraphs A-C describe, wherein the one or more temporal logic formulas comprise at least one of metric-intersection linear temporal logic; linear temporal logic; or signal temporal logic.

E: A system as any one of paragraphs A-D describe, wherein the limitation comprises a region that is to be occupied exclusively by the vehicle or an object.

F: A system as paragraph E describes, wherein at least one of a size or a shape of the region is based at least in part on a classification associated with the object.

G: A method comprising: identifying data associated with a parameter for instantiating a simulation of a controller; receiving a limitation corresponding to a property that the controller is required to satisfy; generating a first group of simulations based at least in part on the data associated with the parameter; determining, utilizing a temporal logic formula, a first cost associated with a first simulation of the first group of simulations and a second cost associated with a second simulation of the first group of simulations; identifying, based at least in part on the first cost and the second cost, a subset of simulations; generating a second group of simulations based at least in part on the subset of simulations; and identifying the simulation as an exemplary simulation for controller policy violation.

H: A method as paragraph G describes, wherein identifying the simulation as the exemplary simulation includes: iteratively generating groups of simulations; and identifying the simulation as the exemplary simulation based at least in part on a cost associated with the simulation being less than a threshold cost.

I: A method as either paragraph G or H describe, wherein the subset of simulations is identified based at least in part on costs associated with respective simulations of the subset of simulations being at least one of: below a threshold cost; one of a predetermined number of lowest cost simulations; or one of a predetermined percentage of the lowest cost simulations.

J: A method as any one of paragraphs G-I describe, wherein the first cost and the second cost are determined based at least in part on a metric that is defined by a distance to a disjunction and a distance to an intersection.

K: A method as any one of paragraphs G-J describe, further comprising: ranking simulations of the first group of simulations based at least in part on respective costs associated with the simulations.

L: A method as any one of paragraphs G-K describe, wherein generating the second group of simulations comprises: applying one or more evolutionary algorithms to the subset of simulations.

M: A method as any one of paragraphs G-L describe, further comprising: sending the exemplary simulation to the controller; and causing the controller to modify one or more control algorithms based at least in part on the exemplary simulation.

N: A system or device comprising: a processor; and a non-transitory computer-readable medium storing instructions that, when executed, cause processor to perform a computer-implemented method as any one of paragraphs G-M describe.

O: A system or device comprising: a means for processing; and a means for storing coupled to the means for processing, the means for storing including instructions to configure one or more devices to perform a computer-implemented method as any one of paragraphs G-M describe.

P: A non-transitory computer-readable medium storing instructions that, when executed, cause one or more processors to perform operations comprising: identifying data associated with a parameter for instantiating a simulation of a controller; receiving a limitation corresponding to a property that the controller is required to satisfy; and iteratively generating groups of simulations based at least in part on a cost associated with each simulation of the groups of simulations, wherein the cost associated with each simulation is calculated utilizing a temporal logic formula.

Q: A non-transitory computer-readable medium as paragraph P describes, wherein iteratively generating the groups of simulations comprises: generating a first group of simulations; calculating a first cost associated with a first simulation of the first group of simulations and a second cost associated with a second simulation of the first group of simulations; identifying a subset of simulations of the first group of simulations based at least in part on the first cost and the second cost; and generating a second group of simulations based at least in part on an application of an evolutionary algorithm to the subset of simulations.

R: A non-transitory computer-readable medium as paragraphs Q describes, wherein generating the second group of simulations comprises varying characteristics of the subset of simulations, variations comprising at least one of: a position of an object; a velocity of the object; a gain associated with the controller; a weather condition; an object condition; or a vehicle condition.

S: A non-transitory computer-readable medium as paragraphs Q describes, wherein the subset of simulations is identified based at least in part on costs associated with respective simulations of the subset of simulations being at least one of: below a threshold cost; one of a predetermined number of lowest cost simulations; or one of a predetermined percentage of the lowest cost simulations.

T: A non-transitory computer-readable medium as any one of paragraphs P-S describe, the operations further comprising: identifying a simulation of the groups of simulations that violates the limitation; and providing the simulation as an exemplary simulation to the controller for control system modification.

U: A non-transitory computer-readable medium as paragraph T describes, the operations further comprising: causing the controller to modify a control system based at least in part on the exemplary simulation.

V: A non-transitory computer-readable medium as any one of paragraphs P-U describe, wherein the temporal logic formula comprises at least one of: metric-intersection linear temporal logic; linear temporal logic; or signal temporal logic.

W: A vehicle comprising: a processor; and a non-transitory computer-readable medium as any one of paragraphs P-V describe coupled to the processor.

X: A system comprising: a processor; and a non-transitory computer-readable medium as any one of paragraphs P-V describe coupled to the processor.

While the example clauses described above are described with respect to one particular implementation, it should be understood that, in the context of this document, the content of the example clauses can also be implemented via a method, device, system, computer-readable medium, and/or another implementation.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some implementations the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for identifying a simulation for a programmatic logic-based controller, the system comprising:
   one or more processors; and
   one or more computer-readable media storing instructions executable by the one or more processors, wherein the instructions, when executed, cause the system to perform operations comprising:
   identifying data associated with a parameter for instantiating the simulation of the controller;
   receiving a limitation corresponding to a property that the controller is required to satisfy;
   generating a first group of simulations based at least in part on the data associated with the parameter;
   determining, based at least in part on one or more temporal logic formulas, a cost for a simulation of the first group of simulations;
   identifying a subset of simulations of the first group of simulations, the subset of simulations being associated with costs at or below a threshold cost;
   generating a second group of simulations based at least in part on the subset of simulations;
   identifying, using the one or more temporal logic formulas, a simulation of the second group of simulations as an exemplary simulation based at least in part on a determination that the simulation of the second group of simulations violates the limitation; and
   providing the exemplary simulation to the controller for controller policy violation, thereby causing the controller to modify one or more control algorithms based on the exemplary simulation.

2. The system as claim 1 recites, wherein generating the second group of simulations comprises:
   applying one or more evolutionary algorithms to the subset of simulations.

3. The system as claim 1 recites, wherein generating the second group of simulations comprises varying characteristics associated with the subset of simulations, the characteristics comprising at least one of:
   a position of an object;
   a velocity of the object;
   a gain associated with the controller;
   a weather condition;
   an object condition; or
   a vehicle condition.

4. The system as claim 1 recites, wherein the one or more temporal logic formulas comprise at least one of:
   metric-intersection linear temporal logic;
   linear temporal logic; or
   signal temporal logic.

5. The system as claim 1 recites, wherein the limitation comprises a region that is to be occupied exclusively by a vehicle or an object.

6. The system as claim 5 recites, wherein at least one of a size or a shape of the region is based at least in part on a classification associated with the object.

7. A method comprising:
   identifying data associated with a parameter for instantiating a simulation of a controller;
   receiving a limitation corresponding to a property that the controller is required to satisfy;
   generating a first group of simulations based at least in part on the data associated with the parameter;
   determining, utilizing a temporal logic formula, a first cost associated with a first simulation of the first group of simulations and a second cost associated with a second simulation of the first group of simulations;
   identifying, based at least in part on the first cost and the second cost, a subset of simulations;
   generating a second group of simulations based at least in part on the subset of simulations;
   identifying the simulation of the controller as an exemplary simulation for controller policy violation; and
   causing the controller to modify one or more control algorithms based on the exemplary simulation.

8. The method as claim 7 recites, wherein identifying the simulation of the controller as the exemplary simulation includes:
   iteratively generating groups of simulations; and
   identifying the simulation of the controller as the exemplary simulation based at least in part on a cost associated with the simulation being less than a threshold cost.

9. The method as claim 7 recites, wherein the subset of simulations is identified based at least in part on costs associated with respective simulations of the subset of simulations being at least one of:
   below a threshold cost;
   one of a predetermined number of lowest cost simulations; or
   one of a predetermined percentage of the lowest cost simulations.

10. The method as claim 7 recites, wherein the first cost and the second cost are determined based at least in part on a metric that is defined by a distance to a disjunction and a distance to an intersection.

11. The method as claim 7 recites, further comprising:
    ranking simulations of the first group of simulations based at least in part on respective costs associated with the simulations.

12. The method as claim 7 recites, wherein generating the second group of simulations comprises:
    applying one or more evolutionary algorithms to the subset of simulations.

13. The method as claim 7 recites, further comprising:
    sending the exemplary simulation to the controller with an instruction modify the one or more control algorithms based on the exemplary simulation.

14. A non-transitory computer-readable medium storing instructions that, when executed, cause one or more processors to perform operations comprising:
    identifying data associated with a parameter for instantiating a simulation of a controller;
    receiving a limitation corresponding to a property that the controller is required to satisfy;
    iteratively generating groups of simulations based at least in part on a cost associated with each simulation of the groups of simulations, wherein the cost associated with each simulation is calculated utilizing a temporal logic formula; and
    in response to determining that a simulation of the groups of simulations violates the limitation, causing the controller to modify a control system based on the simulation.

15. The non-transitory computer-readable medium of claim 14, wherein iteratively generating the groups of simulations comprises:
generating a first group of simulations;
calculating a first cost associated with a first simulation of the first group of simulations and a second cost associated with a second simulation of the first group of simulations;
identifying a subset of simulations of the first group of simulations based at least in part on the first cost and the second cost; and
generating a second group of simulations based at least in part on an application of an evolutionary algorithm to the subset of simulations.

16. The non-transitory computer-readable medium of claim 15, wherein generating the second group of simulations comprises varying characteristics of the subset of simulations, variations comprising at least one of:
a position of an object;
a velocity of the object;
a gain associated with the controller;
a weather condition;
an object condition; or
a vehicle condition.

17. The non-transitory computer-readable medium of claim 15, wherein the subset of simulations is identified based at least in part on costs associated with respective simulations of the subset of simulations being at least one of:
below a threshold cost;
one of a predetermined number of lowest cost simulations; or
one of a predetermined percentage of the lowest cost simulations.

18. The non-transitory computer-readable medium of claim 14, the operations further comprising:
identifying the simulation of the groups of simulations that violates the limitation; and
providing the simulation as an exemplary simulation to the controller for control system modification.

19. The non-transitory computer-readable medium of claim 14, wherein the temporal logic formula comprises at least one of:
metric-intersection linear temporal logic;
linear temporal logic; or
signal temporal logic.

20. The non-transitory computer-readable medium of claim 14, wherein:
the limitation comprises a region that is to be occupied exclusively by a vehicle or an object, and
at least one of a size or a shape of the region is based at least in part on a classification associated with the object.

* * * * *